(12) United States Patent
Qian et al.

(10) Patent No.: US 11,460,687 B2
(45) Date of Patent: Oct. 4, 2022

(54) ERECTING SYSTEM AND BINOCULAR TELESCOPE FOR LASER RANGING

(71) Applicant: JINHUA LANHAI PHOTOELECTRICITY TECHNOLOGY CO., LTD., Jinhua (CN)

(72) Inventors: Xiangwei Qian, Jinhua (CN); Chongqiu Liu, Jinhua (CN)

(*) Notice: Subject to any disclaimer, the term of this patent is extended or adjusted under 35 U.S.C. 154(b) by 829 days.

(21) Appl. No.: 16/396,704

(22) Filed: Apr. 28, 2019

(65) Prior Publication Data
US 2020/0341261 A1    Oct. 29, 2020

(51) Int. Cl.
| | | |
|---|---|---|
| *G02B 23/00* | (2006.01) | |
| *G02B 23/10* | (2006.01) | |
| *G02B 23/18* | (2006.01) | |
| *G01S 7/481* | (2006.01) | |
| *G01S 17/08* | (2006.01) | |
| *G01S 7/51* | (2006.01) | |
| *G02B 25/00* | (2006.01) | |

(52) U.S. Cl.
CPC ............ *G02B 23/10* (2013.01); *G01S 7/4816* (2013.01); *G01S 7/51* (2013.01); *G01S 17/08* (2013.01); *G02B 23/18* (2013.01); *G02B 25/001* (2013.01)

(58) Field of Classification Search
CPC ...... G02B 23/10; G02B 23/18; G02B 25/001; G02B 23/00; G02B 23/02; G02B 23/04; G02B 5/04; G01S 7/4816; G01S 7/51; G01S 17/08; G01S 7/4865; F41G 1/00; F41G 1/38
USPC .......... 356/5.01, 4.01, 8, 9, 17, 18; 359/362, 359/363, 399, 400, 407, 831, 833, 834, 359/835, 836; 42/111, 119, 142
See application file for complete search history.

(56) References Cited

U.S. PATENT DOCUMENTS

| | | | | |
|---|---|---|---|---|
| 10,288,735 B1* | 5/2019 | Wang | ........................ | G02B 5/04 |
| 2009/0174939 A1* | 7/2009 | Heintz | ..................... | G02B 5/04 |
| | | | | 359/480 |
| 2010/0265490 A1* | 10/2010 | Watanabe | ................ | G01C 3/04 |
| | | | | 356/5.01 |

* cited by examiner

*Primary Examiner* — Arnel C Lavarias

(57) ABSTRACT

An erecting system and a binocular telescope for laser ranging. The erecting system includes a roof half penta prism, a beam splitting prism and an isosceles prism. The beam splitting prism is positioned between the roof half penta prism and the isosceles prism. The beam splitting prism is formed by bonding two right-angle prisms. A beam splitting film is arranged on a bonding surface of the two right-angle prisms. The erecting system not only has simple structure and small occupation volume, but also is convenient in use, can realize the binocular observation and targeting at a measured object, and can display the distance of the measured object in real time in the field of view while observing the object.

9 Claims, 4 Drawing Sheets

ERECTING SYSTEM AND BINOCULAR TELESCOPE FOR LASER RANGING

TECHNICAL FIELD

The present invention belongs to the technical field of laser ranging, and in particular to an erecting system and a binocular telescope for laser ranging.

BACKGROUND

A range finder is an instrument designed for length and distance measurement by using the characteristics of reflection, interference and the like of light, sound, and electromagnetic waves. Based on the length measurement, a novel range finder can use a length measurement result to scientifically calculate other parameters such as area, perimeter, volume and mass of a target to be measured, and is widely applied in engineering application, GIS survey, military and other fields.

A ranging telescope is an important branch of the range finder. At present, a laser light path and a visible light path of a laser ranging telescope are divided into two unrelated light paths, so that the telescope can only be used as a laser ranging sight, and cannot be used to measure the distance while observing. The reason is that the measured distance cannot be displayed in the field of view of the telescope, which brings a lot of inconvenience to the user. At the same time, optical components of the product for observation and ranging are independent, like a combination of building blocks, resulting in an increase in the volume of the telescope product, an increase in weight, difficulty in carrying, and inconvenience in operation.

Therefore, how to provide an erecting system and a binocular telescope for laser ranging has become an urgent problem to be solved by those skilled in the art.

SUMMARY

In view of this, the present invention provides an erecting system and a binocular telescope for laser ranging. The present invention not only has simple structure and small occupation volume, but also is convenient in use, and can realize the binocular observation and aiming at the measured object, and can display the distance of the measured object in real time in the visual field while observing the object.

To achieve the above purpose, the present invention adopts the following technical solution:

An erecting system comprises a roof half penta prism, a beam splitting prism and an isosceles prism, wherein the beam splitting prism is positioned between the roof half penta prism and the isosceles prism; the beam splitting prism is formed by bonding two right-angle prisms; and a beam splitting film is arranged on a bonding surface of the two right-angle prisms.

Preferably, the beam splitting prism is a square structure, and bevels of two isosceles right-angle prisms are in joint connection, so that the beam splitting film can be coated on the bevels. The joint connection of the bevels of the two isosceles right-angle prisms ensures incident and emission efficiency of the bonding surface and reduces the loss of light.

Preferably, the roof half penta prism comprises a roof receiving and transmitting surface, a roof outer reflecting surface, a roof inner reflecting surface and a roof top surface; both ends of the roof receiving and transmitting surface are respectively intersected with one end of the roof outer reflecting surface and one end of the roof inner reflecting surface; both ends of the roof top surface are respectively intersected with the other end of the roof outer reflecting surface and the other end of the roof inner reflecting surface; moreover, an included angle between the roof inner reflecting surface and the roof receiving and transmitting surface is 112.5 degrees; an included angle between the roof receiving and transmitting surface and the roof outer reflecting surface is 45 degrees; and an included angle between the roof outer reflecting surface and the roof top surface is 90 degrees. Thus, not only the volume of the erecting system is reduced, but also the influence of the roof half penta prism on the light beam is reduced, so that stability and reliability are high, the volume is small and the structure is compact.

Preferably, the isosceles prism comprises two isosceles surfaces and one bottom surface; one end of the two isosceles surfaces is intersected, and the other end is respectively intersected with both ends of the bottom surface; moreover, an included angle between the two isosceles surfaces is 45 degrees; and an included angle between the isosceles surfaces and the bottom surface is 67.5 degrees. Thus, not only the volume of the erecting system is reduced, but also the loss of the light beam is reduced, thereby improving light transmittance and ensuring the clarity of object observation and the ranging display.

A binocular telescope for laser ranging comprises eyepiece groups, objective lens groups and erecting systems which are respectively installed in two lens barrels; the erecting systems are positioned between the eyepiece groups and the objective lens groups; a laser transmitter is arranged between the two lens barrels; a photodetector and a liquid crystal display are arranged in one lens barrel;

a light path received by each of the objective lens groups is outputted to one eyepiece group through the erecting system;

a laser light path received by each of the objective lens groups passes through the erecting system and then enters the photodetector; and a light path of the liquid crystal display passes through the erecting system and then is outputted to the other eyepiece group.

Preferably, a field diaphragm is arranged between the eyepiece groups and the erecting system. When the imaging of a distant object and the imaging of the eyepiece group are both at the field diaphragm, the clarity of object observation is high.

Preferably, the photodetector and the liquid crystal display are respectively arranged on both sides of the erecting system.

Preferably, a display lens group is arranged between the liquid crystal display and the beam splitting prism; the light path of the liquid crystal display passes through the display lens group and vertically enters the beam splitting prism; after reflected by the bevels of the isosceles right-angle prism, the light path of the liquid crystal display is vertically incident into the isosceles prism, is sequentially reflected by the isosceles surface, the bottom surface, and the isosceles surface, and then is vertically incident into the eyepiece groups. A displayed distance digit is reflected by a display lens group and a beam splitting film on the beam splitting prism, passes through the isosceles prism and is imaged at the field diaphragm. Then, the displayed distance digit passes through the eyepiece group and finally enters human eyes and is read to realize real-time observation and distance measurement of the distant object.

Preferably, a focusing objective lens is arranged between the objective lens groups and the erecting system. The positions of the focusing objective lens and the objective lens groups are adjusted so that the distant object is imaged at the field diaphragm, which is beneficial for improving the clarity of object observation.

Preferably, after the light path received by the objective lens group passes through a focusing objective lens, the light path enters the roof half penta prism through the roof receiving and transmitting surface, then is successively reflected by the roof inner reflecting surface and the roof outer reflecting surface and vertically passes through the beam splitting prism to enter the isosceles prism, and is successively reflected by the isosceles surface, the bottom surface and the isosceles surface and is vertically incident into the eyepiece group, so as to realize the binocular observation and targeting at a measured object.

Preferably, a receiving lens is arranged between the photodetector and the beam splitting prism; After the laser light path received by the objective lens group passes through a focusing objective lens, the laser light path enters the roof half penta prism through the roof receiving and transmitting surface, then is successively reflected by the roof inner reflecting surface and the roof outer reflecting surface and is vertically incident into the beam splitting prism, is reflected by the bevels of the isosceles right-angle prism and then is vertically incident into a receiving lens, and passes through the receiving lens to enter the photodetector. The laser transmitter emits an infrared laser that is incident onto the distant object. A light signal reflected by the object is reflected by the objective lens group, the focusing objective lens, the roof half penta prism and the beam splitting film on the beam splitting prism, passes through the receiving lens, and finally is received by the photodetector. The distance of the distant object is calculated according to a time difference between the transmission of the laser and the reception of the light signal through the processing of a photoelectric signal; and the distance is displayed on the liquid crystal display, thereby realizing accurate measurement of the distance of the object.

Preferably, the photodetector is arranged at one side of the erecting system; the liquid crystal display is arranged at a field diaphragm of one lens barrel; and a field diaphragm of the other lens barrel is provided with plate glass.

The present invention has the following beneficial effects:

The erecting system of the present invention comprises the roof half penta prism, the beam splitting prism and the isosceles prism. Not only the volume of the erecting system is reduced, but also the influence on the light beam is reduced, so that stability and reliability for object observation by the telescope are improved. The laser transmitter is arranged between the two lens barrels. The photodetector and the liquid crystal display are arranged in one lens barrel. The present invention not only can realize the binocular observation and targeting at the measured object, but also can display the distance of the measured object in real time in the field of view while observing the object. Moreover, when the laser transmitter, the photodetector and the liquid crystal display are turned off, the present invention can also be used as an ordinary telescope which is small in volume and convenient in carrying and use.

DESCRIPTION OF DRAWINGS

To more clearly describe the technical solution in the embodiments of the present invention or in the prior art, the drawings required to be used in the description of the embodiments or the prior art will be simply presented below. Apparently, the drawings in the following description are merely the embodiments of the present invention, and for those ordinary skilled in the art, other drawings can also be obtained according to the provided drawings without contributing creative labor.

In the figures.

1—roof half penta prism; 11—roof transmitting surface; 12—roof outer reflecting surface; 13—roof inner reflecting surface; 14—roof top surface; 2—beam splitting prism; 21—beam splitting film; 3—isosceles prism; 31—isosceles surface; 32—bottom surface; 4—eyepiece group; 5—objective lens group; 51—focusing objective lens; 6—laser transmitter; 61—transmitting lens; 7—photodetector; 71—receiving lens; 8—liquid crystal display; 81—display lens group; 9—field diaphragm; 10—plate glass; 101—isosceles trapezoid prism; and 102—triangular prism.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Figure 1:
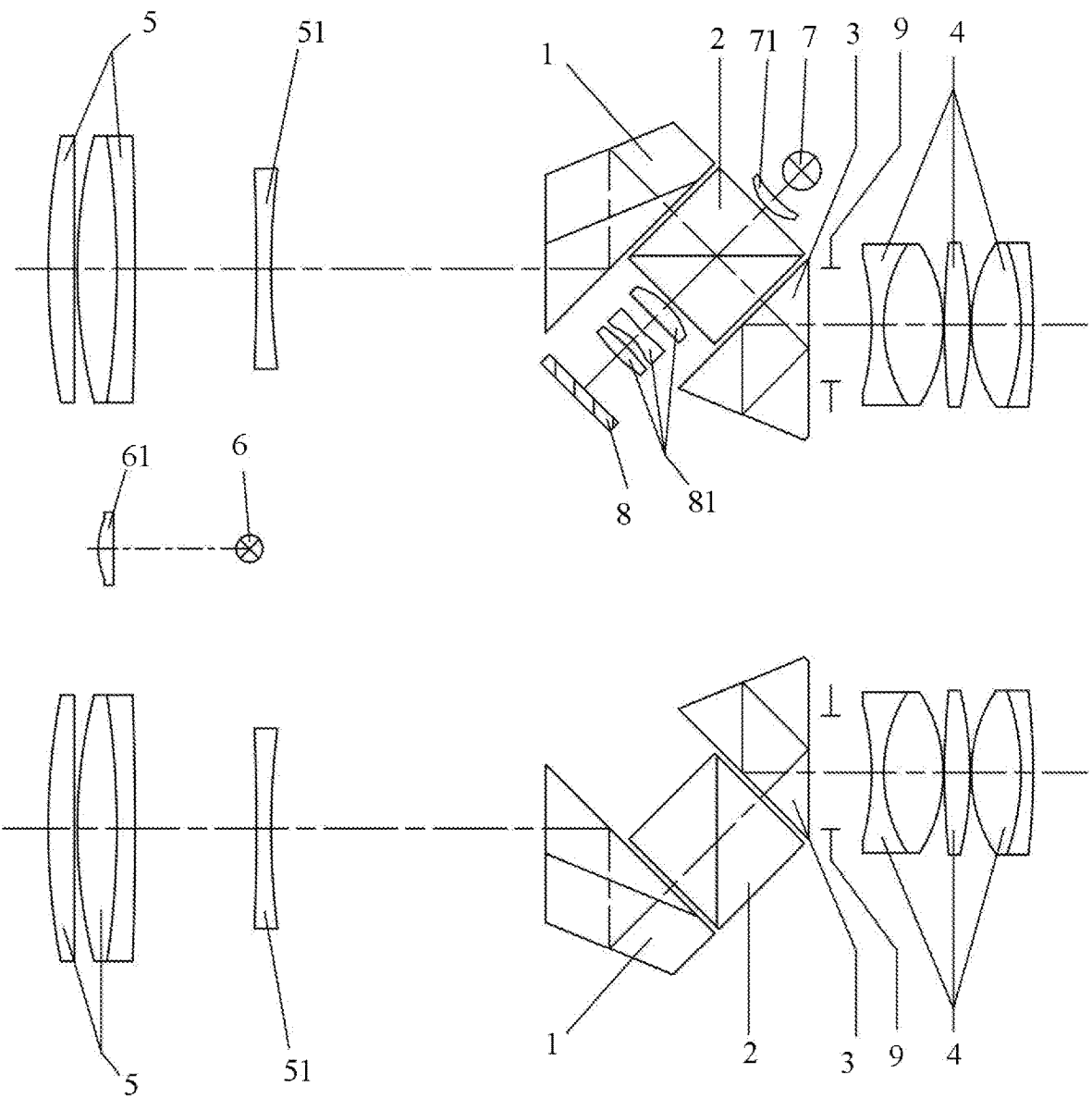
FIG. 1 is a structural schematic diagram of an erecting system of the present invention.

By referring to FIG. 1, the present invention provides an erecting system comprising a roof half penta prism 1, a beam splitting prism 2 and an isosceles prism 3, wherein the beam splitting prism 2 is positioned between the roof half penta prism 1 and the isosceles prism 3; the beam splitting prism 2 is formed by bonding two right-angle prisms; and a beam splitting film 21 is arranged on a bonding surface of the two right-angle prisms.

The beam splitting prism 2 is a square structure, and bevels of two isosceles right-angle prisms are in joint connection, so that the beam splitting film 21 can be coated on the bevels. The joint connection of the bevels of the two isosceles right-angle prisms ensures incident and emission efficiency of the bonding surface and reduces the loss of light, wherein an included angle $\eta$ between two right-angle surfaces is 90 degrees, and an included angle $\theta$ between the right-angle surfaces and the bevels is 45 degrees.

The roof half penta prism 1 comprises a roof receiving and transmitting surface 11, a roof outer reflecting surface 12, a roof inner reflecting surface 13 and a roof top surface 14; both ends of the roof receiving and transmitting surface 11 are respectively intersected with one end of the roof outer reflecting surface 12 and one end of the roof inner reflecting surface 13; both ends of the roof top surface 14 are respectively intersected with the other end of the roof outer reflecting surface 12 and the other end of the roof inner reflecting surface 13; moreover, an included angle $\alpha$ between the roof inner reflecting surface 13 and the roof receiving and transmitting surface 11 is 112.5 degrees; an included angle β between the roof receiving and transmitting surface 11 and roof outer reflecting surface 12 is 45 degrees; and an included angle γ between the roof outer reflecting surface 12 and the roof top surface 14 is 90 degrees. Thus, not only the volume of the erecting system is reduced, but also the influence of the roof half penta prism 1 on the light beam is reduced, so that stability and reliability are high, the volume is small and the structure is compact.

The isosceles prism 3 comprises two isosceles surfaces 31 and one bottom surface 32; one end of the two isosceles surfaces 31 is intersected, and the other end is respectively intersected with both ends of the bottom surface 32; moreover, an included angle δ between the two isosceles surfaces 31 is 45 degrees; and an included angle ε between the isosceles surfaces 31 and the bottom surface 32 is 67.5 degrees. Thus, not only the volume of the erecting system is reduced, but also the loss of the light beam is reduced, thereby improving light transmittance and ensuring the clarity of object observation and the ranging display.

Figure 2:
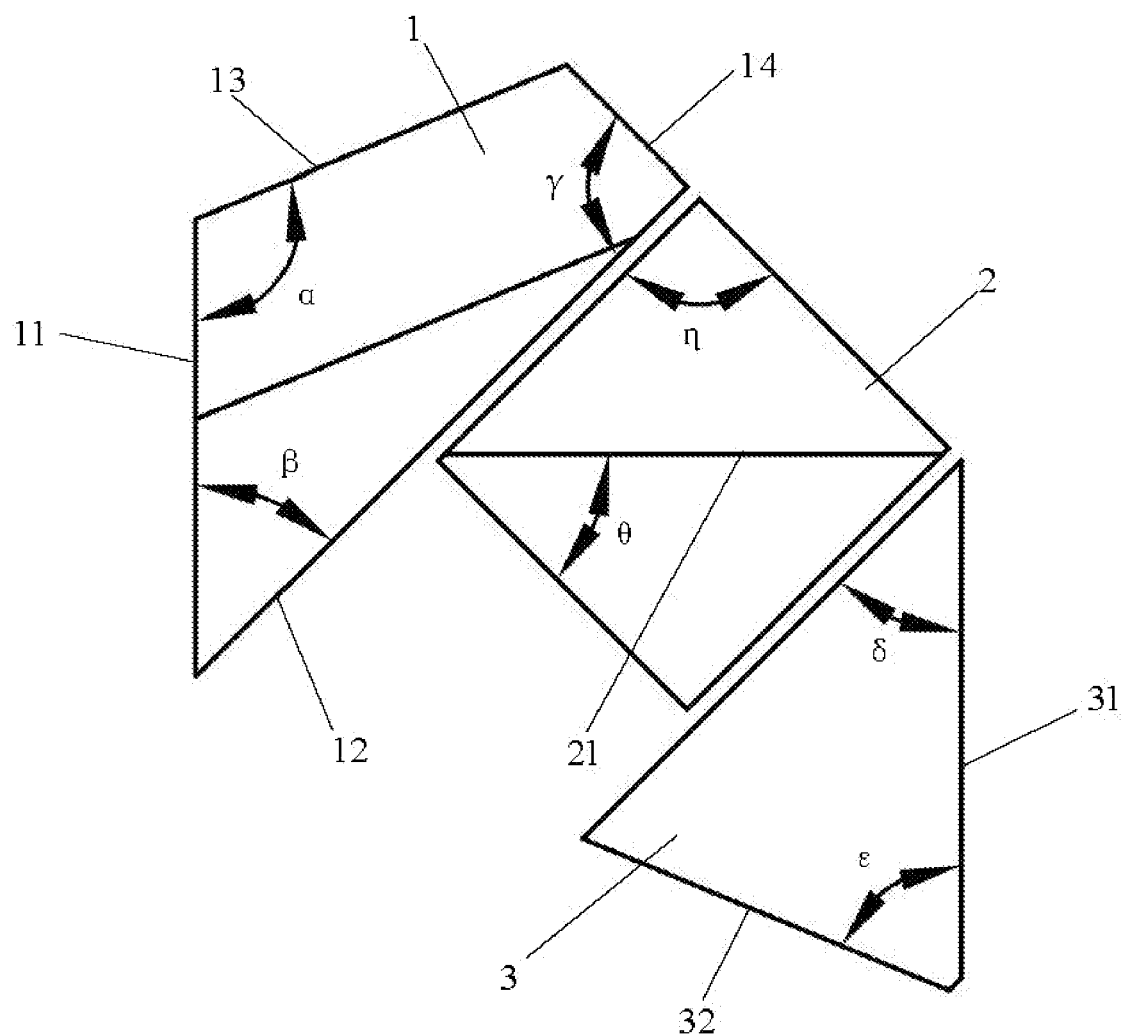
FIG. 2 is a structural schematic diagram of an embodiment of a binocular telescope for laser ranging in the present invention.

By referring to FIG. 2, the present invention provides a binocular telescope for laser ranging, comprising eyepiece groups 4, objective lens groups 5 and erecting systems which are respectively installed in two lens barrels; the erecting systems are positioned between the eyepiece groups 4 and the objective lens groups 5; a laser transmitter 6 is arranged between the two lens barrels; a photodetector 7 and a liquid crystal display 8 are arranged in one lens barrel;

a light path received by each of the objective lens groups 5 is outputted to one eyepiece group 4 through the erecting system;

a laser light path received by each of the objective lens groups 5 passes through the erecting system and then enters the photodetector 7; and a light path of the liquid crystal display 8 passes through the erecting system and then is outputted to the other eyepiece group 4.

In another embodiment, the eyepiece groups 4 comprise a first lens, a second lens and a third lens which are successively arranged from left to right; and the first lens, the second lens and the third lens are arranged coaxially.

In another embodiment, the objective lens groups 5 comprise a fourth lens, a fifth lens and a sixth lens which are successively arranged from left to right; and the fourth lens, the fifth lens and the sixth lens are arranged coaxially.

In another embodiment, the laser transmitter 6 adopts a semiconductor laser or laser diode that transmits an infrared band.

In another embodiment, the photodetector 7 is an avalanche diode (APD) or a photodiode (PD) or a PIN diode.

In another embodiment, the liquid crystal display 8 can be an organic light emitting diode (OLED) or a backlight display LCD.

In another embodiment, the light path on which the laser transmitter 6 transmits laser is provided with a transmitting lens 61; and the laser can be collimated by the transmitting lens 61 and then is incident onto the distant object.

In another embodiment, the laser transmitter 6 can be arranged in a central axis position of the objective lens group 5 close to the telescope, or can be arranged in other positions between the two lens barrels of the telescope.

In another embodiment, a field diaphragm 9 is arranged between the eyepiece groups 4 and the erecting system. When the imaging of the distant object and the imaging of the eyepiece group 4 are both at the field diaphragm 9, the clarity of object observation is high.

In another embodiment, a focusing objective lens 51 is arranged between the objective lens groups 5 and the erecting system. The positions of the focusing objective lens 51 and the objective lens groups 5 are adjusted so that the distant object is imaged at the field diaphragm, which is beneficial for improving the clarity of object observation.

After the light path received by the objective lens group 5 passes through the focusing objective lens 51, the light path enters the roof half penta prism 1 through the roof receiving and transmitting surface 11, then is successively reflected by the roof inner reflecting surface 13 and the roof outer reflecting surface 12 and vertically passes through the beam splitting prism 2 to enter the isosceles prism 3, and is successively reflected by the isosceles surface 31, the bottom surface 32 and the isosceles surface 31 and is vertically incident into the eyepiece group 4, so as to realize the binocular observation and targeting at a measured object.

A receiving lens 71 is arranged between the photodetector 7 and the beam splitting prism 2. After the laser light path received by the objective lens group 5 passes through a focusing objective lens 51, the laser light path enters the roof half penta prism 1 through the roof receiving and transmitting surface 11, then is successively reflected by the roof inner reflecting surface 13 and the roof outer reflecting surface 12 and is vertically incident into the beam splitting prism 2, is reflected by the bevels of the isosceles right-angle prism and then is vertically incident into the receiving lens 71, and passes through the receiving lens 71 to enter the photodetector 7. The laser transmitter 6 emits an infrared laser that is incident onto the distant object. A light signal reflected by the object is reflected by the objective lens group 5, the focusing objective lens 51, the roof half penta prism 1 and the beam splitting film 21 on the beam splitting prism 2, passes through the receiving lens 71, and finally is received by the photodetector 7. The distance of the distant object is calculated according to a time difference between the transmission of the laser and the reception of the light signal through the processing of a photoelectric signal; and the distance is displayed on the liquid crystal display 8, thereby realizing accurate measurement of the distance of the object.

In another embodiment, the photodetector 7 and the liquid crystal display 8 are respectively arranged on both sides of the erecting system.

A display lens group 81 is arranged between the liquid crystal display 8 and the beam splitting prism 2; the light path of the liquid crystal display 8 passes through the display lens group 81 and vertically enters the beam splitting prism 2; after reflected by the bevels of the isosceles right-angle prism, the light path is vertically incident into the isosceles prism, is sequentially reflected by the isosceles surface 31, the bottom surface 32, and the isosceles surface 31, and then is vertically incident into the eyepiece groups 4. A distance digit displayed by the liquid crystal display 8 is reflected by the display lens group 81 and the beam splitting film 21 on the beam splitting prism 2, passes through the isosceles prism 3 and is imaged at the field diaphragm 9. Then, the distance digit passes through the eyepiece group 4 and finally enters human eyes and is read to realize real-time observation and distance measurement of the distant object.

Figure 3:
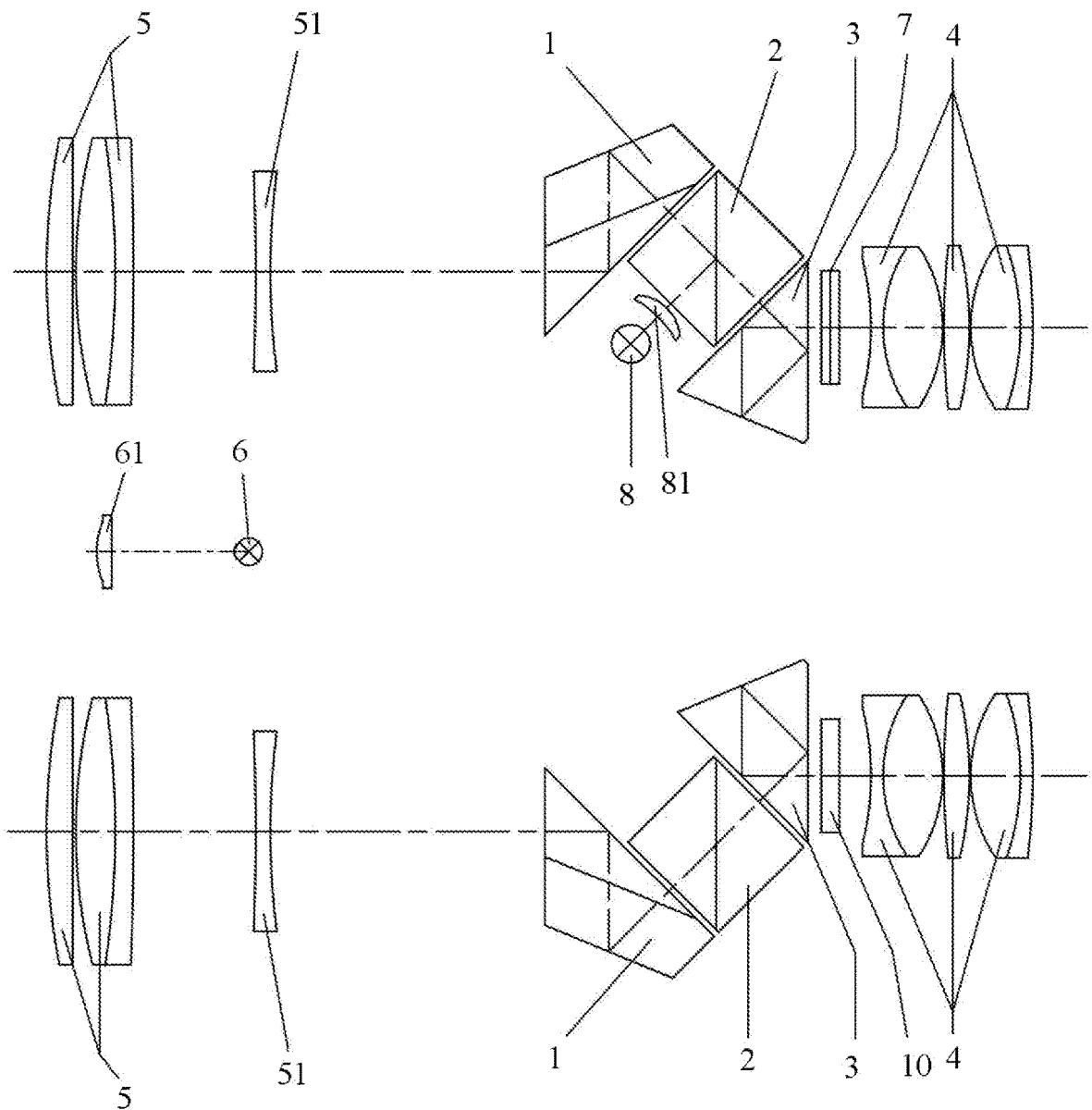
FIG. 3 is a structural schematic diagram of another embodiment of a binocular telescope for laser ranging in the present invention.

In another embodiment, by referring to FIG. 3, the photodetector 7 is arranged at one side of the erecting system; the liquid crystal display 8 is arranged at the field diaphragm of one lens barrel; and the field diaphragm of the other lens barrel is provided with plate glass 10 having the same transmittance as the liquid crystal display 8.

When the binocular telescope for laser ranging is used for observing the distant object, the eyepiece group 4 is adjusted to focus on the liquid crystal display 8. Then, the positions of the focusing objective lens 51 and the objective lens group 5 are adjusted so that the distant object is also imaged in the position of the liquid crystal display 8, and is observed clearly. Then, the laser transmitter 6 emits an infrared laser that is collimated by the transmitting lens 61 and is incident onto the distant object. A light signal reflected by the object is reflected by the objective lens group 5, the focusing objective lens 51, the roof half penta prism 1 and the beam splitting film 21 on the beam splitting prism 2, passes through the receiving lens 71, and finally is received by the photodetector 7. The distance of the distant object is calculated according to a time difference between the transmission of the laser and the reception of the light signal through the processing of a photoelectric signal; and the distance is displayed on the liquid crystal display 8. The displayed distance digit is directly observed by human eyes through the eyepiece group 4.

Figure 4:
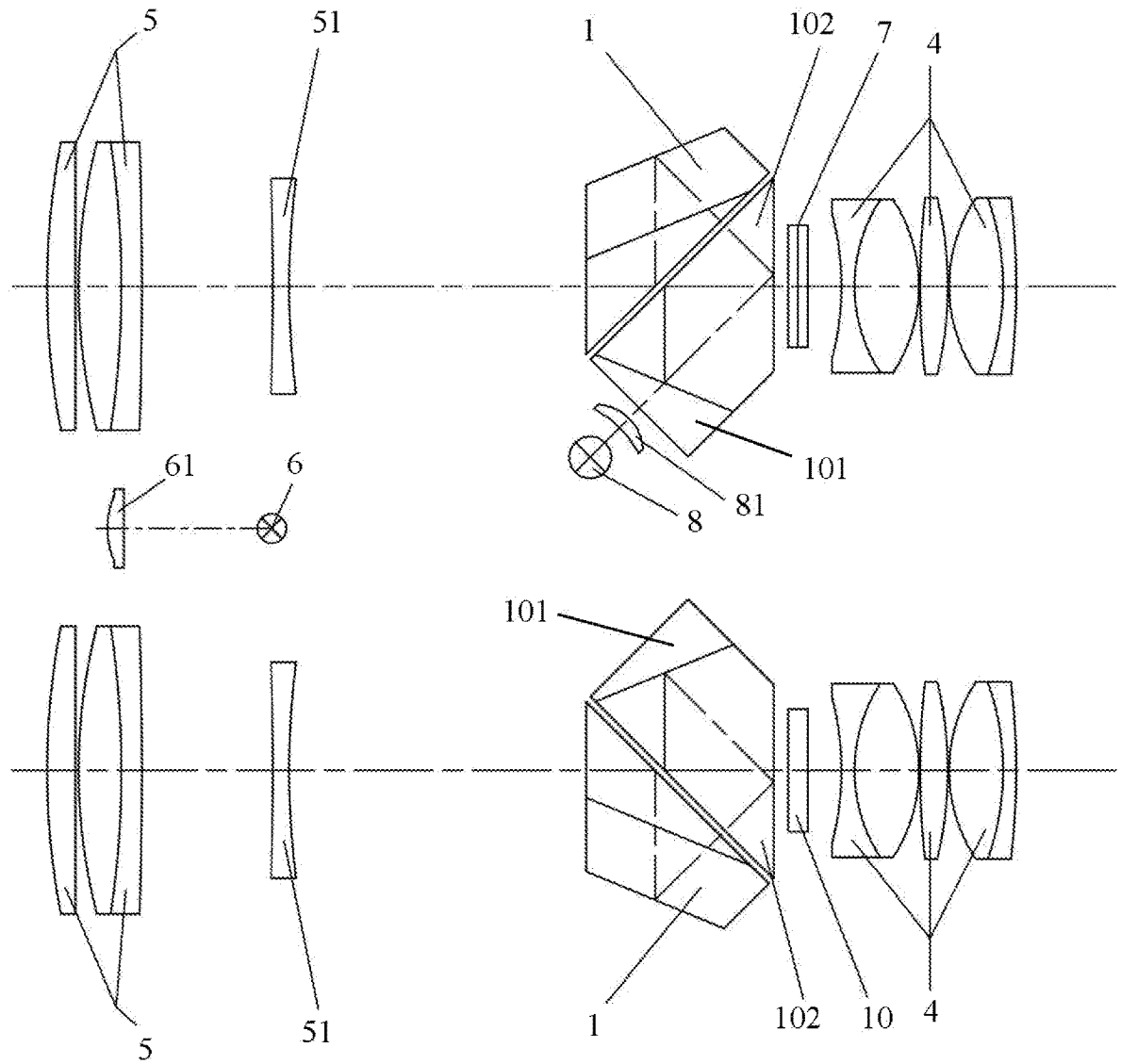
FIG. 4 is a structural schematic diagram of still another embodiment of a binocular telescope for laser ranging in the present invention.

In another embodiment, by referring to FIG. 4, the roof half penta prism 1, the isosceles trapezoid prism 101 and the triangular prism 102 form the erecting system. The bevels of the isosceles trapezoid prism 101 are bonded with the triangular prism 102. A beam splitting film 21 is arranged on a bonding surface. The photodetector 7 is arranged at one side of the erecting system; the liquid crystal display 8 is arranged at the field diaphragm of one lens barrel; and the field diaphragm of the other lens barrel is provided with plate glass 10 having the same transmittance as the liquid crystal display 8.

When the binocular telescope for laser ranging is used for observing the distant object, the eyepiece group is adjusted to focus on the liquid crystal display 8. Then, the positions of the focusing objective lens 51 and the objective lens group 5 are adjusted so that the distant object is also imaged in the position of the liquid crystal display 8, and is observed clearly. Then, the laser transmitter 6 emits an infrared laser that is collimated by the transmitting lens 61 and is incident onto the distant object. A light signal reflected by the object is reflected by the objective lens group 5, the focusing objective lens 51, the roof half penta prism 1 and the beam splitting film 21 on the isosceles trapezoid prism 101, passes through the receiving lens 71, and finally is received by the photodetector 7. The distance of the distant object is calculated according to a time difference between the transmission of the laser and the reception of the light signal through the processing of a photoelectric signal; and the distance is displayed on the liquid crystal display 8. The displayed distance digit is directly observed by human eyes through the eyepiece group 4.

The erecting system of the present invention comprises the roof half penta prism 1, the beam splitting prism 2 and the isosceles prism 3. Not only the volume of the erecting system can be reduced, but also the influence on the light beam can be reduced, so that stability and reliability for object observation by the telescope are improved. The laser transmitter 6 is arranged between the two lens barrels. The photodetector 7 and the liquid crystal display 8 are arranged in one lens barrel. The present invention not only can realize the binocular observation and targeting at the measured object, but also can display the distance of the measured object in real time in the field of view while observing the object. Moreover, when the laser transmitter 6, the photodetector 7 and the liquid crystal display 8 are turned off, the present invention can also be used as an ordinary telescope which is small in volume and convenient in carrying and use.

Each embodiment in the description is described in a progressive way. The difference of each embodiment from each other is the focus of explanation. The same and similar parts among all of the embodiments can be referred to each other. For a device disclosed by the embodiments, because the device corresponds to a method disclosed by the embodiments, the device is simply described. Refer to the description of the method part for the related part.

The above description of the disclosed embodiments enables those skilled in the art to realize or use the present invention. Many modifications to these embodiments will be apparent to those skilled in the art. The general principle defined herein can be realized in other embodiments without departing from the spirit or scope of the present invention. Therefore, the present invention will not be limited to these embodiments shown herein, but will conform to the widest scope consistent with the principle and novel features disclosed herein. Therefore, the present invention will not be limited to these embodiments shown herein, but will conform to the widest scope consistent with the principle and novel features disclosed herein.

The invention claimed is:

1. An erecting system, comprising
a roof half penta prism,
a beam splitting prism, and
an isosceles prism, wherein the beam splitting prism is positioned between the roof half penta prism and the isosceles prism; the beam splitting prism is formed by bonding two right-angle prisms; and a beam splitting film is arranged on a bonding surface of the two right-angle prisms.

2. The erecting system according to claim 1, wherein the beam splitting prism is a square structure, and bevels of two isosceles right-angle prisms are in joint connection.

3. The erecting system according to claim 2, wherein the roof half penta prism comprises
a roof receiving and transmitting surface,
a roof outer reflecting surface,
a roof inner reflecting surface, and
a roof top surface; both ends of the roof receiving and transmitting surface are respectively intersected with one end of the roof outer reflecting surface and one end of the roof inner reflecting surface; both ends of the roof top surface are respectively intersected with the other end of the roof outer reflecting surface and the other end of the roof inner reflecting surface; moreover, an included angle between the roof inner reflecting surface and the roof receiving and transmitting surface is 112.5 degrees; an included angle between the roof receiving and transmitting surface and the roof outer reflecting surface is 45 degrees; and an included angle between the roof outer reflecting surface and the roof top surface is 90 degrees.

4. The erecting system according to claim 3, wherein the isosceles prism comprises two isosceles surfaces and one bottom surface; one end of the two isosceles surfaces is intersected, and the other end is respectively intersected with both ends of the bottom surface; moreover, an included angle between the two isosceles surfaces is 45 degrees; and an included angle between the isosceles surfaces and the bottom surface is 67.5 degrees.

5. A binocular telescope for laser ranging, comprising eyepiece groups, objective lens groups and erecting systems which are respectively installed in two lens barrels; the erecting systems are positioned between the eyepiece groups and the objective lens groups; a laser transmitter is arranged between the two lens barrels; a photodetector and a liquid crystal display are arranged in one lens barrel;

a light path received by each of the objective lens groups is outputted to one eyepiece group through the erecting system;

a laser light path received by each of the objective lens groups passes through the erecting system and then enters the photodetector; and a light path of the liquid crystal display passes through the erecting system and then is outputted to an other eyepiece group;

wherein the photodetector and the liquid crystal display are respectively arranged on both sides of the erecting system.

6. The binocular telescope for laser ranging according to claim 5, wherein a display lens group is arranged between the liquid crystal display and a beam splitting prism; the light path of the liquid crystal display passes through the display lens group and vertically enters the beam splitting prism; after reflected by bevels of an isosceles right-angle prism, the light path of the liquid crystal display is vertically incident into an isosceles prism, is sequentially reflected by an isosceles surface, a bottom surface, and another isosceles surface, and then is vertically incident into the eyepiece groups.

7. The binocular telescope for laser ranging according to claim 6, wherein after the light path received by the objective lens group passes through a focusing objective lens, the light path enters a roof half penta prism through a roof receiving and transmitting surface, then is successively reflected by a roof inner reflecting surface and a roof outer reflecting surface and vertically passes through the beam splitting prism to enter the isosceles prism, and is successively reflected by the isosceles surface, the bottom surface and the another isosceles surface and is vertically incident into the eyepiece group.

8. The binocular telescope for laser ranging according to claim 6, wherein a receiving lens is arranged between the photodetector and the beam splitting prism; after the laser light path received by the objective lens group passes through a focusing objective lens, the laser light path enters a roof half penta prism through a roof receiving and transmitting surface, then is successively reflected by a roof inner reflecting surface and a roof outer reflecting surface and is vertically incident into the beam splitting prism, is reflected by the bevels of the isosceles right-angle prism and then is vertically incident into the receiving lens, and passes through the receiving lens to enter the photodetector.

9. The binocular telescope for laser ranging according to claim 5, wherein the photodetector is arranged at one side of the erecting system; the liquid crystal display is arranged at a field diaphragm of one lens barrel; and a field diaphragm of the other lens barrel is provided with plate glass.

* * * * *